Nov. 7, 1961     C. E. MERCIER     3,008,016
METAL ENCLOSED SWITCHGEAR

Filed April 2, 1959     3 Sheets-Sheet 1

INVENTOR.
Carl E. Mercier
BY Fred Wiviott
Attorney

Nov. 7, 1961    C. E. MERCIER    3,008,016
METAL ENCLOSED SWITCHGEAR
Filed April 2, 1959    3 Sheets-Sheet 2

INVENTOR.
Carl E. Mercier
BY
Fred Wiriott
Attorney

Nov. 7, 1961   C. E. MERCIER   3,008,016
METAL ENCLOSED SWITCHGEAR
Filed April 2, 1959   3 Sheets-Sheet 3

INVENTOR.
Carl E. Mercier
BY
Fred Wiviott
Attorney

United States Patent Office 3,008,016
Patented Nov. 7, 1961

3,008,016
METAL ENCLOSED SWITCHGEAR
Carl E. Mercier, West Allis, Wis., assignor to McGraw-Edison Company, Milwaukee, Wis., a corporation of Delaware
Filed Apr. 2, 1959, Ser. No. 803,643
13 Claims. (Cl. 200—50)

This invention relates to metal enclosed switchgear and more particularly to circuit breaker support means for metal enclosed switchgear of the drop-down type.

In metal enclosed switchgear of the drop-down type a circuit breaker is operatively mounted for vertical movement between connected and disconnected positions with respect to stationary circuit and bus bar structure. The unit generally includes a metallic supporting frame, stationary circuit and bus bar structure disposed in its upper portion and a suitable circuit breaker elevating mechanism. By bodily lowering the circuit breaker to its disconnected position it may be isolated from the stationary bus bar structure for servicing and test purposes. When the circuit breaker is elevated, disconnect contacts carried by it engage stationary contacts on the bus bar structure thereby connecting a feeder circuit to the main bus. Switchgear of this type is also generally provided with an interlock mechanism so that the circuit breaker cannot be moved between its connected and disconnected positions while its interrupting contacts are closed.

In substation assemblies it is common practice to utilize a plurality of such units to connect the various feeder lines in the system to the main bus. In prior art installations, each unit is provided with a circuit breaker lifting mechanism which not only performs the function of moving the circuit breaker into its connected position but also that of supporting it in this position. The use of an individual lifting device for each of said units greatly adds to the cost of the installation.

When the circuit breaker utilized in such installations interrupts a heavy fault current, considerable mechanical shock is developed as a result of the energy generated by the arc struck between the interrupting contacts. In drop-down type switchgear this shock tends to move the circuit breaker downward sharply in the first instance. As a result, the circuit breaker must be securely mounted on the supporting structure to prevent parting of the disconnect contacts. However, this mounting must not be too rigid or else such interrupting shocks will be absorbed by the internal components of the circuit breaker which may result in considerable damage thereto.

It is an object of the invention to provide a metal enclosed switchgear unit with means for supporting a circuit breaker in its connected position independently of the circuit breaker lifting mechanism.

It is another object of the invention to provide circuit breaker support means which will absorb the mechanical shock incident to the interruption of a fault current.

It is a further object of the invention to provide metal enclosed switchgear of the drop-down type with circuit breaker aligning means.

These and other objects of the invention will become apparent from the detailed description of the invention taken in view of the drawings in which:

FIG. 5 is a sectional view of a ball transfer utilized in the present invention.

In general terms, the invention comprises providing metal enclosed switchgear with resilient support means for supporting the circuit breaker in its connected position independently of the circuit breaker lifting assembly and which absorbs the energy incident to the interruption of a fault current. In a preferred embodiment of the invention the support means includes a resilient bracket member mounted adjacent the circuit breaker when it is in its connected position and pin means which are adapted to rapidly engage and disengage pin receiving means in said circuit breaker. Another aspect of the invention comprises the provision of guide means for insuring that the circuit breaker assumes the correct position relative to the pin means and the bracket means as well as the disconnect contacts.

Figure 1:
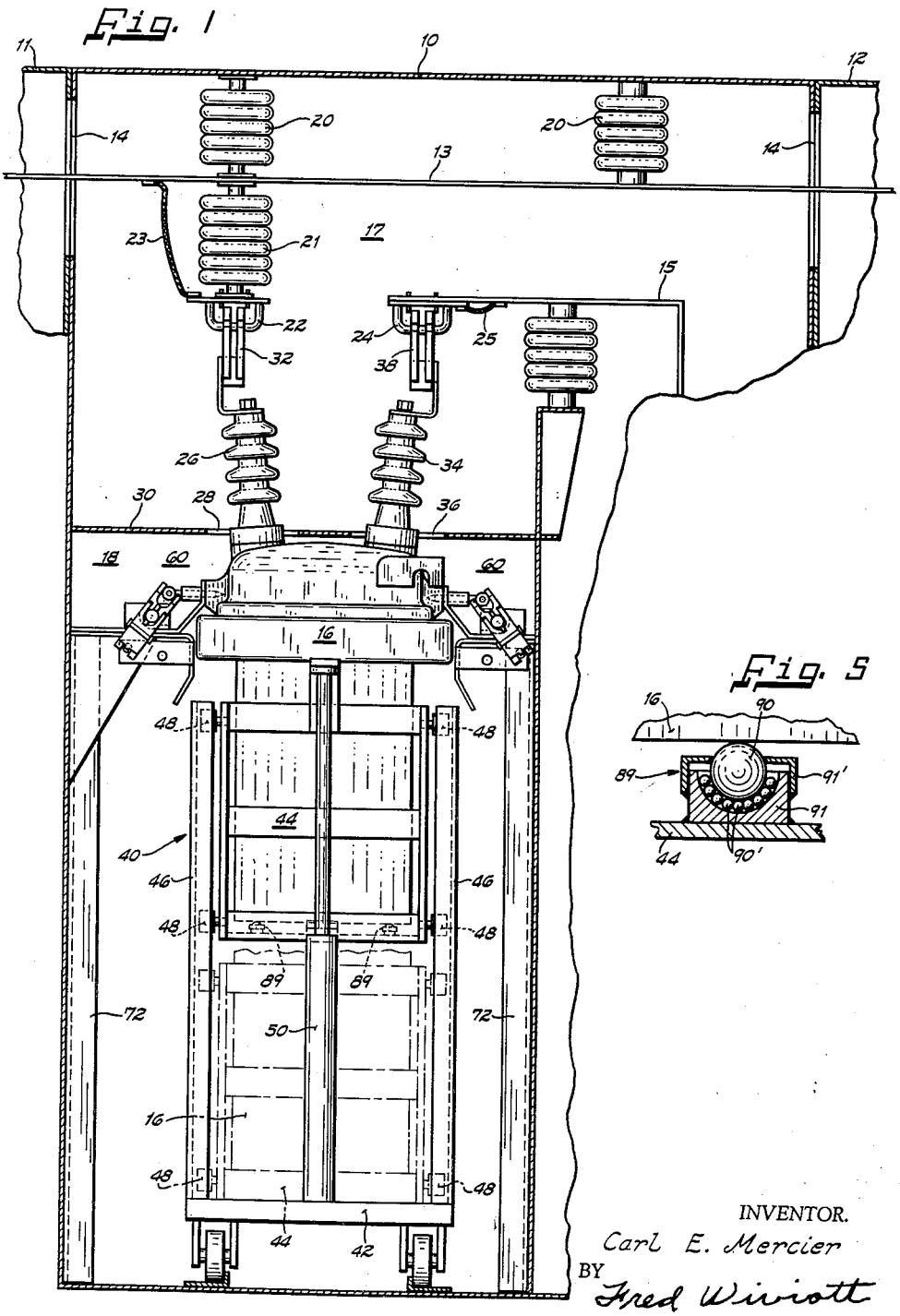
FIG. 1 is an elevational view of metal clad switchgear embodying present invention with parts of the metallic housing broken away.

Referring now to the drawings in greater detail, FIG. 1 shows a metal enclosed switchgear unit which includes a cubicle 10 formed of a suitable metallic supporting frame and sheet metal walls. A number of such units 10, 11 and 12 are usually disposed in side by side abutment so that various distribution circuits can be supplied and controlled from a common substation. Power is supplied to each distribution circuit from a common bus 13 which extends through openings 14 in the sides of each unit. The power supply or incoming bus 13 is connected to the outgoing or distribution system bus 15 through a suitable circuit breaker 16 disposed in cubicle 10. Suitable doors not shown are provided in cubicle 10 so that access may be had to the interiorly disposed components when desired.

Cubicle 10 is partitioned into an upper compartment 17 and a lower compartment 18. In a polyphase system, incoming bus bars 13 of each phase are supported in the upper cubicle 17 and each is insulated from the metallic walls thereof by suitable insulating members 20. Mounted vertically below bus bars 13 on insulators 21 are incoming stationary line disconnect contacts 22 which are electrically connected to the incoming bus bars 13 by flexible conducting straps 23. In horizontal space relation to the incoming stationary line contacts 22 are the outgoing stationary disconnect contacts 24 which are electrically connected to the outgoing bus 15 by flexible conducting straps 25.

The three phase circuit breaker 16 disposed in lower cubicle 18, has line terminals 26 which extend through openings 28 in the upper wall 30 of compartment 18 when said circuit breaker is in its connected position as shown in FIG. 1. Each line terminal 26 is provided with movable line disconnect contacts 32 which engage the stationary line contacts 22 when the circuit breaker is in said connected position. Similarly, circuit breaker 16 is provided with load terminals 34 each of which extends through openings 36 in wall 30 and each of which is provided with movable load disconnect contacts 38 which engage the stationary load contacts 24 when the device is in its connected position.

A suitable lift truck 40 of the mechanical or hydraulic type is provided for raising and lowering the circuit breaker 16 between its connected position shown in full in FIG. 1 and its disconnected position shown by dashed lines wherein it may be removed from the compartment 18. The hydraulic lift type truck illustrated in FIG. 1 includes a rectangular base portion 42 and a bed portion 44. An upright rail 46 is disposed at each of the four corners of the rectangular base portion 42 for cooperation with guide rollers 48 mounted on bed portion 44 so that said bed portion is guided as it is raised by the hydraulic lifting assembly 50. After the circuit breaker 16 has been raised to its connected position, identical pinning mechanism 60, disposed on each of the lateral sides thereof, are operated to their engaged position so that the hyraulic lift truck bed 44 may be lowered, removed from cubicle 10 and utilized for the positioning of another circuit breaker disposed in one of the adjacent cubicles 11 or 12.

Figure 2:
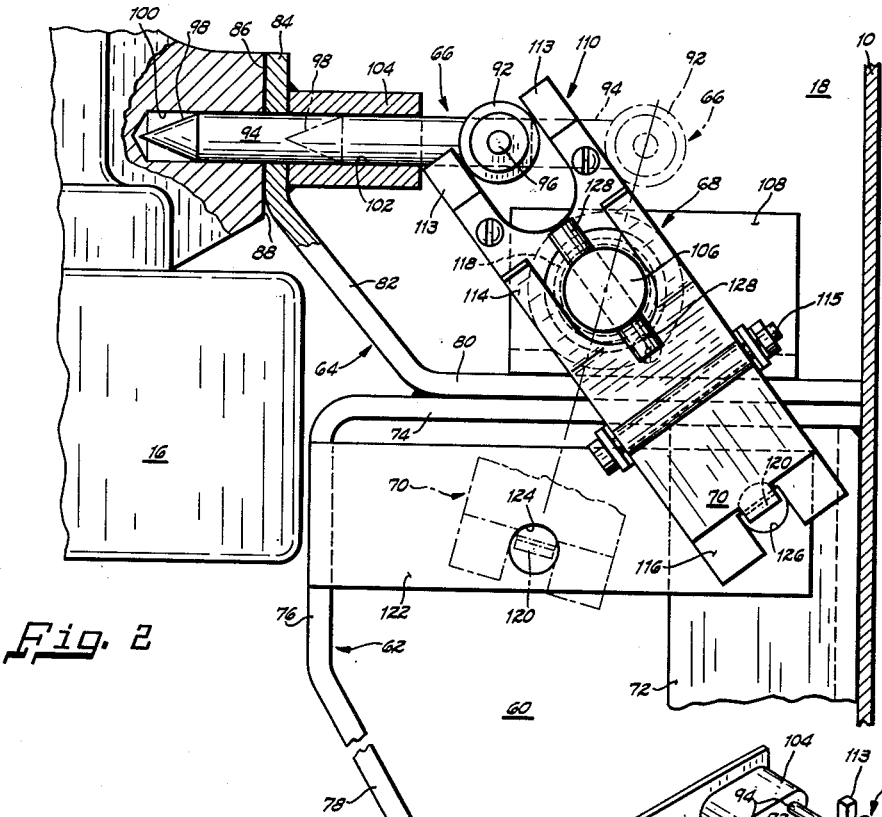
FIG. 2 is an elevational view partly in section of the circuit breaker support mechanism according to the instant invention.
Figure 3:
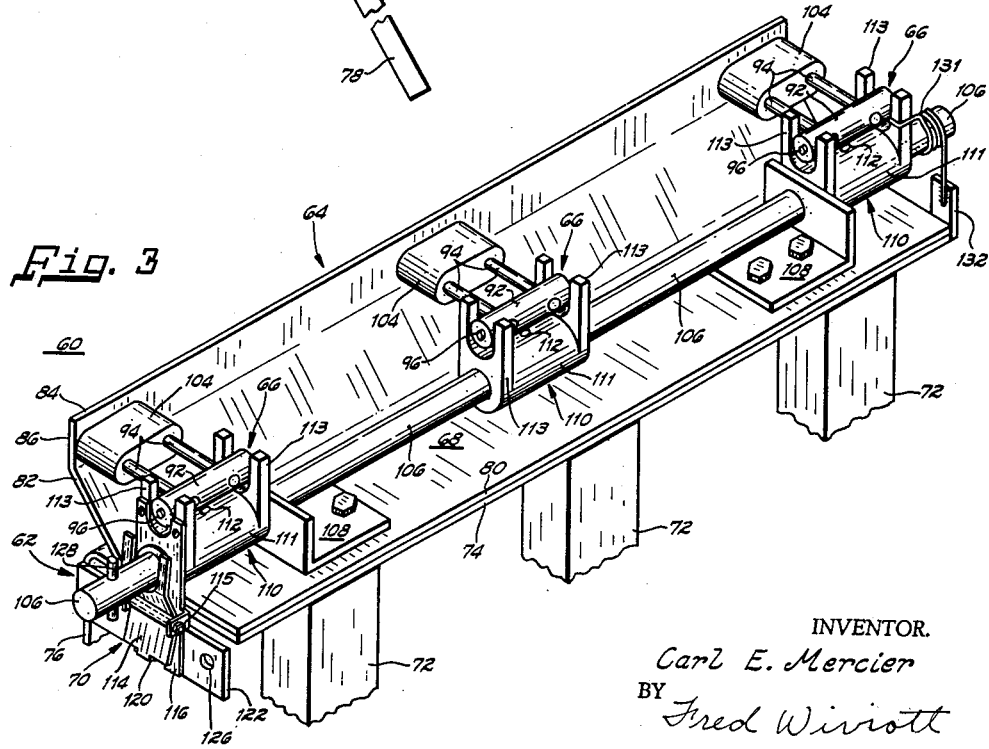
FIG. 3 is a perspective view of the circuit breaker support mechanism according to the instant invention.
Figure 4:
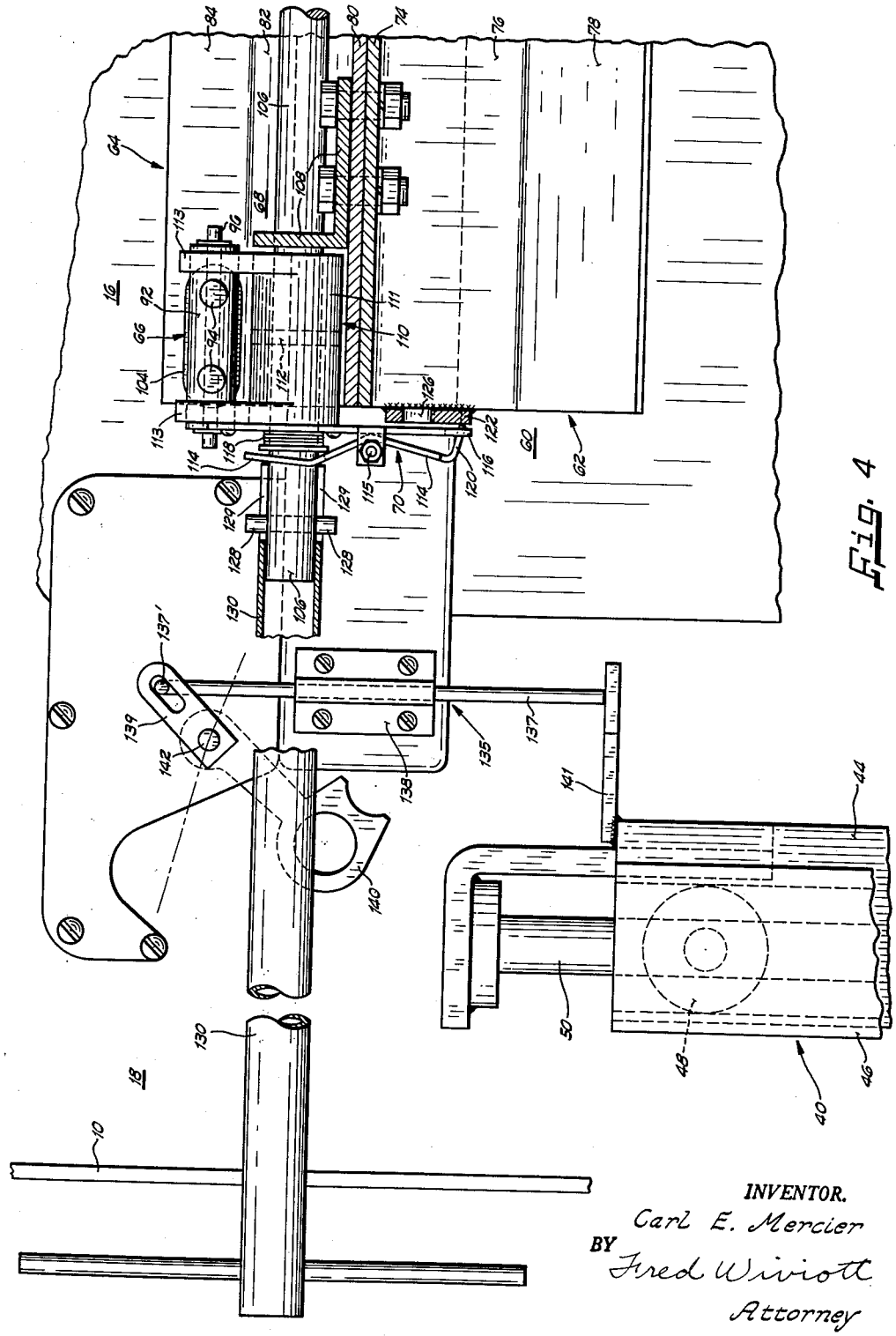
FIG. 4 is an elevational view of a portion of the circuit breaker support mechanism and interlocking mechanism according to the instant invention.

Referring now to FIG. 2, 3 and 4, each pinning mechanism 60, only one of which is shown, comprises a supporting bracket 62 for supporting the remainder of the mechanism and for guiding the circuit breaker into position, a resilient mounting bracket 64 for supporting said circuit breaker and absorbing the shocks incident to the interruption of a fault, pin assemblies 66 for coupling the circuit breaker to the mounting bracket 64, a plurality of pin positioning assemblies 68 for operating said pin assemblies, and a locking assembly 70 for locking said mechanism in its pinned and unpinned position.

The supporting bracket 62 is mounted at the upper end of a plurality of vertical column members 72 which are a part of the metallic supporting frame and which are secured to the lateral walls of the lower compartment 18. Supporting bracket 62 includes a horizontally disposed supporting portion 74 upon whose upper surface the remaining portions of the assembly are supported and whose lower surface is secured to the upper ends of column members 72. Disposed at the inner edge of the supporting portion 74 is a downwardly depending vertical positioning portion 76 which terminates at its lower end in a second positioning portion 78 extends obliquely downwardly and outwardly therefrom. These positioning portions, on either side of the circuit breaker's path, serve to guide it into alignment with the stationary disconnect contacts 22 and 24 as it is raised toward its connected position. It can be seen from FIG. 3 that the supporting bracket member 62 is composed of a continuous sheet metal member which has been bent into the desired shape.

The mounting bracket member 64 serves to transmit the weight of the circuit breaker 16 from the pinning assembly 66 to the support bracket member 62 and the supporting columns 72 and also to resiliently absorb the shocks accompanying the interruption of a heavy fault current. The supporting bracket member 64 also includes a horizontal portion 80 which is mounted on the horizontal portion 74 of the support bracket member 62 in any suitable manner such as welding. Extending inwardly and upwardly at an oblique angle from the inner end of the horizontal portion 80 is a circuit breaker positioning portion 82. A circuit breaker embracing portion 84 extends vertically upward from the inner end of positioning portion 82. The latter two portions are cantilevered from the end of horizontal portion 80. It can be seen from FIGS. 1 and 2 that the inner surface 86 of the vertical embracing portion 84 snugly engages a matching vertical surface 88 on the upper end of the circuit breaker casing when said circuit breaker is in its connecting position shown in full in FIG. 1. As the circuit breaker 16 is being raised into this position the inwardly extending positioning portions 82 on either side of the circuit breaker tend to guide the surfaces 88 into alignment between surfaces 86 of the embracing portions 84. This also aligns movable disconnect contacts 32 and 38 with stationary contacts 22 and 24. As shown in FIGS. 1 and 5 the surface of the truck bed 44 may be provided with a plurality of ball transfer assemblies 89 to facilitate movement of the relatively heavy circuit breaker 16 into alignment. Each of these ball transfer assemblies 89 includes a ball member 90 mounted in a cup-shaped body member 91 suitably affixed to the surface of the truck bed 44. Ball bearings 90 are disposed between the ball member 90 and the body member 91 so that only rolling friction must be overcome in aligning circuit breaker 16. An apertured cap member 91' for retaining ball member 90 in position, telescopes over the upper end of body member 91 and is suitably affixed thereto.

Each of the pin assemblies 66 comprises a cylindrical body portion 92 and a pair of pin members 94. Each of the pin members 94 extends perpendicularly through the body member 92 in substantial parallelism with each other and each is secured therein by a pin 96 extending coaxially through said body member and intersecting each of the pin members 94. A conical surface 98 is formed on the inner end of each of the pin members and each resides in one of a pair of parallel bores 102 formed through each of a plurality of guide blocks 104, one of which is associated with each pin assembly and each of which is suitably mounted on the outer surface of the perpendicular embracing portion 84 of mounting bracket 64. When the circuit breaker is in its connected position the bores 102 will be in substantial register with suitable cylindrical recesses 100 formed in the head of circuit breaker 16. Conical surface 98 facilitates the entrance of pins 94 into recesses 100 in the event some misalignment still exists.

Each of the pinning assemblies is movable from an engaged position shown in full in FIG. 2 wherein the circuit breaker is secured in its connected position to a disengaged position shown dotted in FIG. 2 wherein the circuit breaker is free to be lowered to its disconnected position. It will be recalled that movement of the pinning assemblies between these positions is accomplished by the positioning mechanism 68. The latter mechanism includes a shaft member 106 suitably journaled in a pair of L-shaped bracket members mounted on the upper surface of the horizontal portion 80 of the bracket member 64 and a positioning block member 110 associated with each of the pin assemblies 66. Each of the positioning block members 110 includes a body portion 111 having a longitudinal bore formed therein for receiving shaft 106 to which it is affixed by means of a pin 112 extending therethrough. Each positioning block also includes a laterally extending support portion 113 disposed at each of the ends thereof and each of which has a pair of parallel arm portions joined by a U-shaped bearing surface between which the ends of the body portions 92 of pinning assembly 66 are embraced.

In order to hold the positioning mechanism 68 in its engaged and disengaged positions, locking assembly 70 is provided and includes a locking arm 114 pivotally mounted at 115 on a support plate 116 which is secured to the outer vertical surface of the left most positioning block as viewed in FIG. 3 and rotatable therewith. As seen in FIGS. 3 and 4, a biasing spring 118 surrounds shaft 108 and is disposed between the upper end of locking arm 112 and plate 116 to urge a locking latch 120 disposed at the lower end thereof against the surface of a locking plate 122 extending outwardly along the lefthand edge of support bracket 62. Locking plate 122 is provided with a pair of locking holes 124 and 126 which are so spaced relative to locking latch 120 that when the pinning assembly is in its engaged or disengaged positions, as shown in full and dashed respectively in FIG. 2, said locking latch will be coaxial one of said openings so that biasing spring 118 is able to rotate it into the appropriate one of said openings. In this manner the pinning assembly is locked in its two positions against accidental movement as a result of vibrations and the like, incident to the operation of circuit breaker 16.

In order to rotate shaft 110, its outer end is provided with a transverse lug pin 128 which may be embraced by a suitable slotted wrench 130 shown in FIG. 4. As the end of the wrench 130 telescopes over the end of shaft 110 it engages locking lever 114 and rotates it in a clockwise direction as viewed in FIG. 4. This moves locking latch 120 out of the locking holes 124 or 126 so that the positioning assembly 68 is then free to rotate to its alternate position. After positioning assembly 68 has been rotated sufficiently to move pins 94 into or out of engagement with recesses 101, whichever the case may be, locking latch 120 is adjacent one of the locking holes so that removal of wrench member 130 frees said locking latch for rotation into the appropriate one of the locking holes. Hence, it can be seen from FIG. 4 that the releasing of locking plate 122 and the rotation of the positioning assembly 68 can be accomplished from the exterior of the device thereby insuring a maximum of safety.

A torsion spring 131 is provided to prevent partial rotation of pins 94 into recesses 100. It can be seen from FIG. 3 that torsion spring 131 surrounds the righthand end of shaft 108 and has one end affixed to the righthand most body member 110 and its other end is secured to ear 132 extending from the supporting bracket 62. Hence, if the positioning assembly 68 is moved to some intermediate position torsion between locking holes 124 and 126, spring 131 will rotate it in a counterclockwise direction as viewed in FIGS. 2 and 3, until pins 94 are in their fully engaged position and locking latch 120 is adjacent locking hole 124 so that it may be rotated therein by biasing spring 118. Torsion spring 131 also helps to retain pins 94 in their engaged position.

It can be seen from FIG. 2 that the pins 94 tend to be in shear between the surfaces 86 of the mounting bracket 64 and surface 88 of circuit interrupter 16. This is minimized, however, by the action of the mounting bracket member 64. It can be seen from FIG. 2 that as the circuit breaker 16 is transferred from the lift truck 40 to the pinning mechanism, its weight will tend to deflect guide portion 82 and embracing portion 84 in a counterclockwise direction about the junction between said guide portion 82 and the horizontal portion 80. This causes surfaces 88 of circuit breaker 16 to be embraced in a tight compressive relation between surfaces 86 of the embracing portion 84 thereby relieving pins 94 of a portion of the weight of said circuit breaker.

When circuit breaker 16 interrupts a heavy fault current, the energy generated in the resultant arc produces a severe mechanical shock tending to move the circuit breaker bodily away from the stationary disconnect contacts. If the device were rigidly mounted in the supporting frame, this shock would be absorbed by the circuit breaker itself, tending to result in damage thereto, and by the pin members 94, tending to shear them off. The action of the mounting bracket obviates both of these tendencies. Referring now to FIG. 2, the suddenly applied downward force accompanying an interruption is transmitted from the circuit breaker 16 to the pin members 94 and then to the mounting bracket 64. This tends to deflect guide portion 82 and embracing portion 84 in a counterclockwise direction. This deflection is resisted by circuit breaker 16 so that portions 82 and 84 of mounting bracket 64 deform slightly and surface 86 of bracket 64 and 88 of the circuit breaker 16 are forced into a tight compressive relation. After the impact of the interruption subsides, portions 82 and 84 recover their original shapes. By this deformation and recovery the supporting bracket 64 dissipates the interrupting energy it absorbed from the circuit breaker 16. The compression of surfaces 86 and 88 tends to further relieve pin members 94 of the weight of circuit breaker 16 thereby minimizing the shearing stress in said pins.

In order to prevent the circuit breaker 16 from being moved between its connected and disconnected positions while its primary interrupting contacts are closed, an interlock assembly 135 is provided. This includes a slide rod 137 which is slidably mounted on the exterior casing of circuit breaker 16 by a slide bracket 138 and whose angular upper end 137' engages a slot 139 in the circuit breaker operating handle 140. Lift truck 50 is provided with a slide rod engaging plate 141 suitably positioned so that it engages slide rod 137 whenever the bed portion 44 of lift truck 40 engages said circuit breaker. This forces slide rod 137 upwardly to rotate in a counterclockwise direction operating handle 140 and contact opening shaft 142, to which said handle is affixed, thereby opening the circuit breaker's main contacts. As a result, when circuit breaker 16 is being raised or when the bed portion 44 of lift truck 40 is raised to engage said circuit breaker in preparation to the lowering thereof from its connected position, the circuit breaker interrupting contacts must be open.

While the invention has been described with reference to a metal enclosed switchgear unit having a three phase circuit breaker, it will be understood by those skilled in the art that it has equal application to switchgear units which merely have a metallic supporting frame without sheet metal wall panels as well as to installations having a single phase circuit breaker unit. Also, it will be understood that the pin members and the pin positioning means can be mounted on the circuit breaker housing and the pin receiving means disposed on the supporting members instead of as shown in the preferred embodiment. Accordingly, in the appended claims, it is intended to cover all such modifications which fall within the true spirit of the invention and which would be obvious to those skilled in the art.

It is claimed:

1. In metal enclosed switchgear the combination of a stationary metallic supporting frame, a circuit breaker movable within said supporting frame between connected and disconnected positions, resilient bracket means mounted on said frame and adjacent the sides of said circuit breaker when the same is in its connected position, releasable engaging means for selectively securing said circuit breaker means to said bracket means so that said circuit breaker is supported in its connected position, said resilient bracket means absorbing the shocks incident to the interruption of a fault current by said circuit breaker.

2. In metal enclosed switchgear the combination of a stationary metallic frame, a circuit breaker movable within said supporting frame between connected and disconnected positions, bracket means mounted in said frame adjacent a pair of opposite sides of said circuit breaker when the same is in its connected position and having portions compressively embracing said opposite sides, engaging means mounted on said bracket means and selectively movable into and out of engagement with said circuit breaker for supporting the same in said connected position, the weight of said circuit breaker tending to deflect said bracket means toward said casing so that it is compressed between said portions in a weight supporting relation.

3. In metal enclosed switchgear of the drop-down type, the combination of a stationary metallic frame, a circuit breaker movable vertically within said supporting frame between connected and disconnected positions, resilient bracket means mounted in said frame adjacent one pair of opposite sides of said circuit breaker when the same is in its connected position and having surfaces compressively embracing said opposite sides, guide means mounted on said frame for guiding said casing between said surfaces as it is being raised toward its connected position, engaging means mounted on said bracket means and selectively movable into and out of engagement with said circuit breaker for supporting the same in said connected position, the weight of said circuit breaker tending to deflect said bracket means toward said casing so that it is compressed between said surfaces in a weight supporting relation, said bracket means absorbing the shocks incident to the interruption of a fault current by said circuit breaker.

4. In metal enclosed switchgear of the drop-down type, the combination of, a stationary metallic frame, a circuit breaker movable vertically in said supporting frame between connected and disconnected positions, at least two resilient bracket members mounted on said supporting frame and extending toward a pair of opposite sides of said circuit breaker, said bracket members each having a portion compressively embracing the casing of said circuit breaker when it is in its connected position, the casing of said circuit breaker having a plurality of pin engaging means, pin means mounted on each of said bracket members and selectively movable into and out of engagement with said pin engaging means for supporting said circuit breaker, the weight of said circuit breaker causing deflection of said portions toward said casing so that the compressive effect thereof is increased to thereby relieved said pin means of a portion of the weight of said circuit breaker.

5. In metal enclosed switchgear of the drop-down type, the combination of, a stationary metallic frame, a circuit breaker movable vertically within said frame between connected and disconnected positions, at least two resilient bracket members disposed on a pair of opposite sides of said circuit breaker and mounted on said supporting frame, each of said bracket members having a portion extending obliquely upward and toward its associated one of said opposite sides, each of said portions terminating in a surface which compressively embraces its associated one of said sides when said circuit breaker is in its connected position, guide means mounted on said supporting frame for guiding said casing between said surfaces as it is raised toward said connected position, said casing haivng pin receiving means on each of said opposite sides, pin means mounted on each of said bracket means and selectively movable into and out of engagement with said pin receiving means when said circuit breaker is in its connected position, the weight of said circuit breaker causing deflection of said portions toward said casing so that the compressive effect of said surfaces is increased to thereby relieve said pin means of a portion of the weight of said circuit breaker, said bracket means also resiliently absorbing the shocks incident to the interruption of a fault current by said circuit breaker.

6. In metal enclosed switchgear of the drop-down type, the combination of, a stationary metallic frame, a circuit breaker movable vertically within said frame between connected and disconnected positions, a positioning assembly disposed on each of the opposite sides of said circuit breaker housing and resiliently mounted on said frame for movement toward and away from said housing, a pin assembly mounted on each of said positioning assemblies and movable therewith, each of said pin assemblies including pin members extending toward said casing, said casing having pin receiving means lying in the path of said pin members when said circuit breaker is in its connected position, releasable lock means mounted on said frame for selectively preventing movement of said positioning means when said pin means are in engagement with and disengaged from said pin receiving means.

7. In metal enclosed switchgear of the drop-down type, the combination of a stationary metallic frame, a circuit breaker, lift means for moving said circuit breaker vertically within said supporting frame between connected and disconnected positions, resilient bracket means mounted in said frame adjacent a pair of opposite sides of said circuit breaker when the same is in its operative position and having surfaces compressively embracing said opposite sides, guide means mounted on said frame for guiding said casing between said surfaces as it is being raised toward its connected position, said lift means including ball transfer means for supporting said circuit breaker so that alignment is facilitated, engaging means mounted on said supporting frame and selectively movable into and out of engagement with said circuit breaker for supporting the same in said connected position, the weight of said circuit breaker tending to deflect said bracket means toward said casing so that it is compressed between said surfaces in a weight supporting relation.

8. In metal enclosed switchgear of the drop-down type, the combination of a stationary metallic frame, stationary disconnect contacts mounted in the upper portion thereof, a circuit breaker having a casing and movable disconnect contacts, lift means for moving said circuit breaker vertically within said supporting frame between connected and disconnected positions, means for securing said circuit breaker in its connected position, guide means mounted on said frame for guiding said casing so that said disconnect will be moved into alignment as said circuit breaker is being raised toward its connected position, said lift means having ball transfer means for supporting said circuit breaker whereby alignment thereof is facilitated.

9. In a switchgear unit of the drop-down type, the combination of, a stationary supporting frame, a circuit breaker disposed within said supporting frame, lift means for vertically moving said circuit breaker between connected and disconnected positions, pin means mounted on said frame adjacent a pair of opposite sides of said circuit breaker when it is in its connected position, said circuit breaker having pin receiving means, positioning means for selectively moving said pin means into engagement with said pin receiving means whereby said circuit breaker will be supported in its connected position, and spring means connected to said positioning means and to said frame for biasing said pins toward engagement with said pin receiving means.

10. In a switchgear unit of the drop-down type, the combination of, a stationary supporting frame, a circuit breaker movable vertically within said supporting frame between connected and disconnected positions, pin means disposed on a pair of opposite sides of said circuit breaker, positioning means mounted on said supporting frame for supporting said pin means and being rotatable toward said casing, pin receiving means mounted on said circuit breaker in the path of said pin means so that said pin means may be selectively moved into and out of engagement with said pin receiving means, lock means for said positioning means including a locking lever mounted thereon and rotatable therewith, said lever means also being pivotal about an axis substantially perpendicular to a plane containing the rotational axis of said positioning means, said locking lever having a locking latch on one side of said pivotal axis and extending generally laterally thereof, a latch securing means located adjacent each end of the path of swinging movement of said locking latch as said pin means are rotated by said positioning means between their engaged and disengaged positions relative to said pin receiving means, biasing means disposed between said locking lever and said positioning means for pivoting said locking latch into said securing means so that said pin means are releasably locked in each of said positions.

11. In metal enclosed switchgear of the dropdown type, the combination of a stationary metallic frame, stationary disconnect contacts mounted in the upper portion of said frame, a circuit breaker having movable disconnect contacts mounted thereon, lift truck means having a bed for supporting said circuit breaker and for moving the same vertically within said supporting frame between connected and disconnected positions, means for securing said circuit breaker in its connected position, guide means mounted on said frame for guiding said circuit breaker so that said disconnect contacts will be moved into alignment as said circuit breaker is being raised toward its connected position, said lift truck means having ball transfer means mounted on said bed for slidably supporting said circuit breaker whereby alignment thereof is facilitated and whereby said lift truck means may be removed from said metallic frame after said circuit breaker is secured in its connected position.

12. In metal enclosed switchgear of the dropdown type, the combination of a stationary metallic frame, stationary disconnect contacts mounted in the upper portion thereof, a circuit breaker having movable disconnect contacts, lift means for moving said circuit breaker vertically within said supporting frame between connected and disconnected positions, means for securing said circuit breaker in its connected position, and guide means having portions disposed on a pair of opposite sides of said circuit breaker and lying in planes extending inwardly and upwardly toward said stationary disconnect contacts, whereby the raising of said circuit breaker toward its connected position will cause it to engage said guide means should misalignment exist so that said movable disconnect contacts will be directed into alignment with said stationary disconnect contacts, said lift means having ball transfer means for supporting said circuit breaker whereby alignment thereof is facilitated.

13. In metal enclosed switchgear of the dropdown type, the combination of a stationary metallic frame, stationary disconnect contacts mounted in the upper portion of said frame, a circuit breaker having movable disconnect contacts mounted thereon, lift means disposed in said frame and including circuit breaker supporting means, said lift means being operable to move said circuit breaker vertically within said frame between connected and disconnected positions relative to said stationary disconnect contacts, guide means mounted on said frame for guiding said circuit breaker so that said disconnect contacts will be in alignment as said circuit breaker is being raised toward its connected position, and ball transfer means disposed between said circuit breaker and said circuit breaker supporting means so that said circuit breaker is free for limited sliding movement relative to said supporting means whereby alignment thereof is facilitated.

References Cited in the file of this patent

FOREIGN PATENTS

| | | |
|---|---|---|
| 76,675 | Austria | Dec. 16, 1916 |
| 465,321 | Canada | May 23, 1950 |

UNITED STATES PATENT OFFICE
CERTIFICATE OF CORRECTION

Patent No. 3,008,024                                 November 7, 1961

John O. Roeser

It is hereby certified that error appears in the above numbered patent requiring correction and that the said Letters Patent should read as corrected below.

Column 3, line 38, for "member" read -- lever --; line 39, for "lever" read -- member --.

Signed and sealed this 8th day of May 1962.

(SEAL)
Attest:

ERNEST W. SWIDER                              DAVID L. LADD
Attesting Officer                                      Commissioner of Patents